US012071812B2

(12) United States Patent
Kanuri

(10) Patent No.: US 12,071,812 B2
(45) Date of Patent: Aug. 27, 2024

(54) ROLLING DOOR GUIDE AREA HEATING METHOD AND SYSTEM

(71) Applicant: Overhead Door Corporation, Lewisville, TX (US)

(72) Inventor: Sree Lakshmi Kanuri, Lewisville, TX (US)

(73) Assignee: Overhead Door Corporation, Lewisville, TX (US)

( * ) Notice: Subject to any disclaimer, the term of this patent is extended or adjusted under 35 U.S.C. 154(b) by 793 days.

(21) Appl. No.: 17/025,292

(22) Filed: Sep. 18, 2020

(65) Prior Publication Data

US 2021/0002957 A1 Jan. 7, 2021

Related U.S. Application Data

(62) Division of application No. 15/990,324, filed on May 25, 2018, now Pat. No. 11,371,285.

(51) Int. Cl.
*E06B 9/58* (2006.01)
*E06B 9/17* (2006.01)

(52) U.S. Cl.
CPC .................. *E06B 9/58* (2013.01); *E06B 9/17* (2013.01); *E06B 2009/17069* (2013.01); *E06B 2009/586* (2013.01); *E06B 2009/588* (2013.01)

(58) Field of Classification Search
CPC ................. E06B 2009/586; E06B 9/58; E06B 2009/588; E06B 9/17; E06B 2009/17069; F25D 21/04; F25D 23/021; F25D 13/00
See application file for complete search history.

(56) References Cited

U.S. PATENT DOCUMENTS

| | | | | |
|---|---|---|---|---|
| 3,449,925 A | | 6/1969 | Barroero | |
| 3,590,913 A | * | 7/1971 | Tschudin | F24F 5/0046 52/204.593 |
| 4,689,933 A | | 9/1987 | Biro | |
| 4,791,762 A | | 12/1988 | Hwang | |
| 4,855,567 A | | 8/1989 | Mueller | |
| 4,950,869 A | | 8/1990 | Mueller | |
| 5,119,608 A | | 6/1992 | Glover et al. | |
| 5,203,175 A | | 4/1993 | Farrey et al. | |
| 6,098,992 A | | 8/2000 | Long et al. | |
| 6,152,208 A | | 11/2000 | Kalempa et al. | |
| 6,226,995 B1 | | 5/2001 | Kalempa et al. | |
| 6,434,886 B1 | | 8/2002 | Johnson et al. | |

(Continued)

OTHER PUBLICATIONS

Heat Sink Attachment Methods , available Jul. 15, 2014 from https://www.alphanovatech.com/en/cat_attach.html. (Year: 2014).*

*Primary Examiner* — Abe Massad
*Assistant Examiner* — Jeremy C Ramsey
(74) *Attorney, Agent, or Firm* — Haynes and Boone, LLP

(57) ABSTRACT

A method for heating a door guide area includes: channeling a flow of heated air in a longitudinal first direction in a first conduit; channeling the flow of heated air in a longitudinal second direction different than the first direction in a second conduit; providing heated air to the second and first conduits by routing the heated air directly from a heater laterally across the first conduit to the second conduit; transferring heat from the flow of heated air in the second conduit to a heated space outside of the first and second conduits; and configuring a side portion of a roll-up door to be in the heated space when the roll-up door is in a closed position.

9 Claims, 4 Drawing Sheets

(56) References Cited

U.S. PATENT DOCUMENTS

| | | | |
|---|---|---|---|
| 6,517,221 B1 | 2/2003 | Xie | |
| 6,729,378 B2 | 5/2004 | Simon et al. | |
| 6,733,862 B2 | 5/2004 | Goering | |
| 6,890,612 B2 | 5/2005 | Goering | |
| 6,899,941 B2 | 5/2005 | Goering et al. | |
| 6,910,301 B2 | 6/2005 | Kalempa et al. | |
| 6,922,945 B2 | 8/2005 | Dron | |
| 6,983,565 B2 | 1/2006 | Berry et al. | |
| 7,117,637 B2 | 10/2006 | Delgado et al. | |
| 7,222,457 B2 | 5/2007 | Delgado et al. | |
| 7,340,907 B2 | 3/2008 | Vogh, III | |
| 7,565,770 B2 | 7/2009 | Delgado et al. | |
| 7,578,097 B2 | 8/2009 | Dondlinger et al. | |
| 7,665,246 B1 | 2/2010 | Wagner, Jr. | |
| 7,665,506 B2 | 2/2010 | Coenraets | |
| 7,794,555 B2 | 9/2010 | Lafond et al. | |
| 7,841,377 B2 | 11/2010 | Coenraets | |
| 8,069,898 B1 | 12/2011 | Mullet et al. | |
| 8,316,915 B2 | 11/2012 | Drifka et al. | |
| 8,360,132 B2 | 1/2013 | Drifka | |
| 8,371,357 B2 | 2/2013 | Frede | |
| 8,439,101 B2 | 5/2013 | Kimener | |
| 8,607,842 B2 | 12/2013 | Drifka | |
| 8,678,070 B2 | 3/2014 | Kimener | |
| 8,801,880 B2 | 8/2014 | Lafond et al. | |
| 8,925,617 B2 | 1/2015 | Miller | |
| 9,097,053 B2 | 8/2015 | Drifka | |
| 9,187,953 B2 | 11/2015 | Drifka et al. | |
| 9,199,412 B2 | 12/2015 | Botelho et al. | |
| 9,260,911 B2 | 2/2016 | Gontarski et al. | |
| 9,423,189 B2 | 8/2016 | Hsieh et al. | |
| 9,429,353 B2 * | 8/2016 | Schumacher ........... | F25D 13/00 |
| 2005/0197057 A1 * | 9/2005 | Rohrer ...................... | F24F 9/00 454/191 |
| 2008/0066888 A1 | 3/2008 | Tong et al. | |
| 2008/0093037 A1 | 4/2008 | Kraeutler | |
| 2008/0229665 A1 | 9/2008 | Kimener | |
| 2009/0236053 A1 * | 9/2009 | Kimener ................... | E06B 9/58 160/293.1 |
| 2010/0006239 A1 | 1/2010 | Kraeutler | |
| 2010/0132264 A1 | 6/2010 | Campbell et al. | |
| 2012/0205057 A1 | 8/2012 | Kraeutler | |
| 2013/0048251 A1 | 2/2013 | Xiao et al. | |
| 2013/0061525 A1 | 3/2013 | Drifka | |
| 2013/0133843 A1 | 5/2013 | Kraeutler | |
| 2013/0174990 A1 | 7/2013 | Asbury | |
| 2013/0306252 A1 | 11/2013 | Lambridis et al. | |
| 2014/0179185 A1 | 6/2014 | Malinowski | |
| 2015/0090435 A1 | 4/2015 | Xia et al. | |
| 2016/0132264 A1 | 5/2016 | Butterfield | |
| 2016/0138221 A1 | 5/2016 | Botelho et al. | |
| 2016/0237736 A1 | 8/2016 | Gontarski et al. | |
| 2016/0327351 A1 | 11/2016 | Hsieh et al. | |

* cited by examiner

ROLLING DOOR GUIDE AREA HEATING METHOD AND SYSTEM

CROSS REFERENCE TO RELATED APPLICATIONS

This application is a divisional of U.S. application Ser. No. 15/990,324 filed on May 25, 2018, the entire disclosure of which is hereby incorporated by reference.

TECHNICAL FIELD

This patent disclosure relates generally to side guide columns for roll-up doors and, more particularly, to an apparatus and method for reducing frost buildup in the side guide columns and/or industrial roll-up doors.

BACKGROUND

Door assemblies used in cold storage and/or freezer facilities typically are arranged to open and close within some type of guiding assembly, such as, a vertical pair of columns. However, the door assembly typically is not sealed completely airtight with the guiding assembly, and some air flows into a space or gap between the door itself and the guiding assembly. Because the door assembly is configured in a cold air and/or freezer facility, when the door is opened and closed, air that flows into the gap may cause build-up of frost and/or ice. This build-up of frost or ice can, over time, cause operational malfunctions and even damage to the door assembly or guiding assembly.

SUMMARY

The foregoing needs are met to a great extent by embodiments in accordance with the present disclosure, wherein, in some embodiments allows heating of a door guide area between the door and the side columns.

In one aspect, the disclosure describes a system for heating a door guide area. The system includes: a first conduit for channeling a flow of heated air in a first direction; a second conduit for channeling the flow of heated air in a second direction different than the first direction; a heater fluidly connected to the first conduit and configured to provide heated air to the first and second conduits; a first opening providing fluid communication between the first and second conduits; a second opening providing fluid communication between the first and second conduits so that the first and second openings allow the air provided by the heater to circulate through the first and second conduits; a heat transfer wall part of the second conduit, the heat transfer wall configured to transfer heat from the flow of heated air in the second direction to a space outside of the second conduit that is defined, in part, by the heat transfer wall; and two side supports connected to the heat transfer wall, the side supports located opposing each other and dimensioned and located along with the heat transfer wall to form three sides to encompass a first side, an edge, and a second side of a side portion of a roll-up door when the roll-up door is in a closed position.

In another aspect, the disclosure describes a method for heating a door guide area. The method includes: channeling a flow of heated air in a first direction in a first conduit; channeling the flow of heated air in a second direction different than the first direction in a second conduit; providing heated air to the second and first conduits; providing a first fluid communication between the first and second conduits; providing a second fluid communication between the first and second conduits; transferring heat from the flow of heated air in the second direction to a space outside of the second flow of heated air; and configuring a side portion of a roll-up door to be in the heated space when the roll-up door is in a closed position.

In yet another aspect, the disclosure describes a system for heating a door guide area. The system includes: a first conduit for channeling a flow of heated air in a first direction; a second conduit for channeling the flow of heated air in a second direction opposite the first direction; a heater fluidly connected to the first conduit and configured to provide heated air to the first and second conduits; a first opening providing fluid communication between the first and second conduits; a second opening providing fluid communication between the first and second conduits so that the first and second openings allow the air provided by the heater to circulate through the first and second conduits; a heat transfer wall part of the second conduit, the heat transfer wall configured to transfer heat from the flow of heated air in the second conduit to a space outside of the second conduit that is defined in part by the heat transfer wall; heat transfer fins for collecting heat from heated air in the second conduit, the heat transfer fins attached to the heat transfer wall extend into the second conduit; and two side supports connected to the heat transfer wall, the side supports located opposing each other and dimensioned and located along with the heat transfer wall to form three sides for guiding and encompassing a first side, an edge, and a second side of a side portion of a roll-up door when the roll-up door is closing and in a closed position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in, and constitute a part of, this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
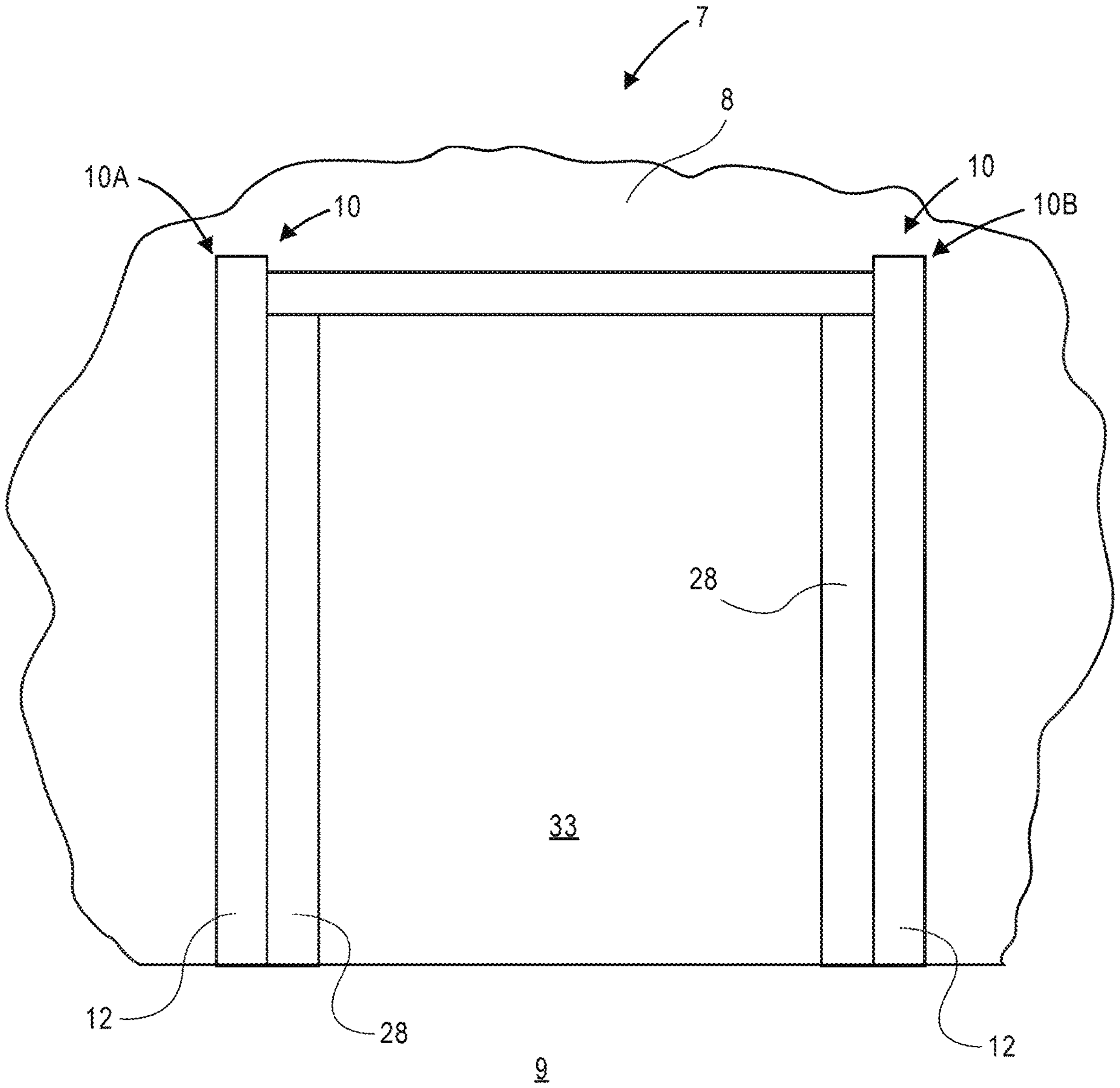
FIG. 1 is front view of a warehouse building have a roll-up door with side support columns in accordance with the present disclosure.

The aspects of the disclosure and the vanous features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 is a front view of a building or warehouse 7. The building 7 has a door 33 which provides assess through a wall 8. The wall 8 may be an interior or external wall 8. The door 33 sits on the floor 9. To guide the door 33 in its up and down travel, the door 33 has side columns 10. The side columns 10 include a frame 12 and side supports 28. When it is desired to distinguish one side column 10 from the other, the left-hand side column is noted as 10A and the right-hand side column is noted as 10B. In some embodiments, columns 10A and 10B are mirror images of each other. When referring to the side columns generally, but not specifically, they are referred to as side columns or column 10.

The door 33 may be used to separate a cold space from an uncooled space, for example, in a warehouse having a room cooled to keep frozen foods. The door 33 rolls up and down to provide access to people and/or vehicles to the cold space.

A desirable trait for roll-up doors separating a cold space from a not cold space is that they can open and close quickly to reduce the amount of warm air that enters the cold space and reduce the amount of cold air that escapes from the cold space into the not cold space when the door is opened or closed. As such, these types of rollup doors tend to be relatively light weight and not rigid.

One of the purposes of the support columns 10 is to guide the door 33 as it moves up and down and, in some instances provide a seal (although the seal may still allow some air to still flow) around the door 33 to reduce an amount cold air from leaving the cold space and reduce the amount of warm air from leaking into the cold space. In some instances, frost and/or ice build-up on the door 33 and/or the support columns 10 can interfere with the guiding functions. To mitigate frost and/or ice, the support columns 10 are heated.

Figure 2:
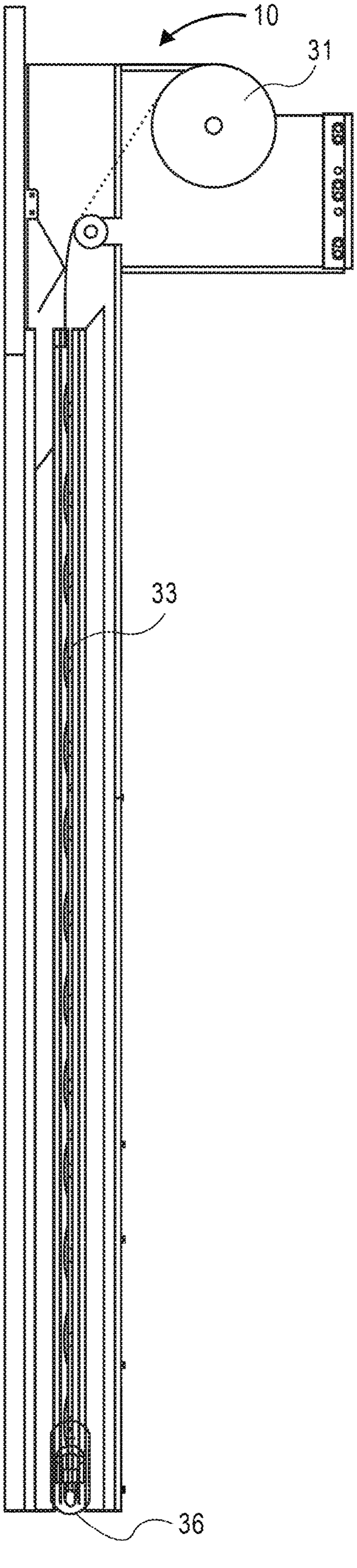
FIG. 2 is a partial side view of a roll-up door residing in a support column in accordance with the present disclosure.

FIG. 2 is a side view of a door 33 located in the side column 10. The side column 10B is removed from the FIG. 2 for clarity. The door 33 is attached to a roller 31. When the door 33 is in an open position, the door 33 is rolled around the roller 31. As shown in FIG. 2., the door 33 has a bottom end 36.

Figure 3:
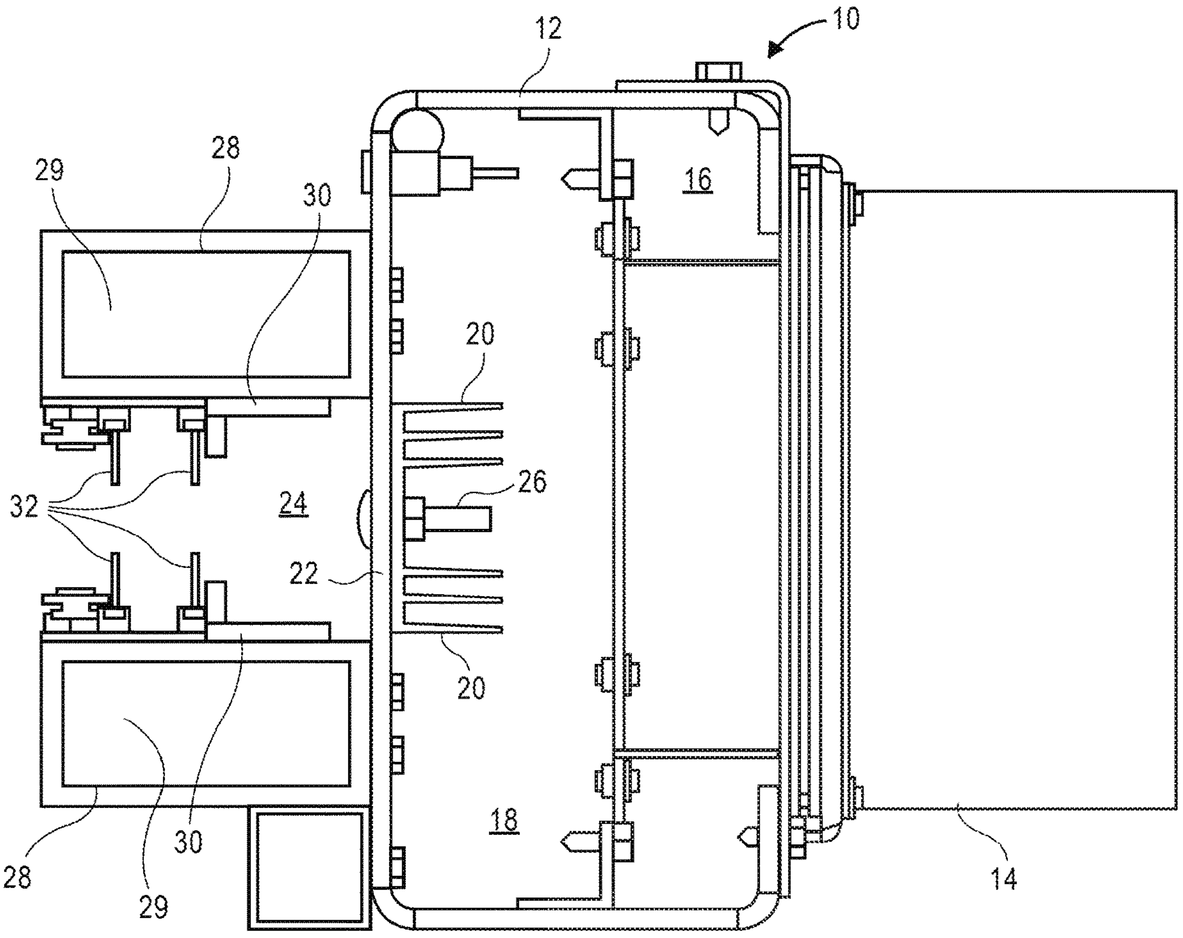
FIG. 3 is a top view of a side support column in accordance with the present disclosure.

FIG. 3 is a top end view of the side column 10. The side column 10 has a frame 12 with a heater 14 connected to the frame 12. The frame 12 has a first air flow chamber or conduit 16 and a second air flow chamber or conduit 18 for circulating air warmed by the heater 14.

As shown in FIG. 3, heat fins 20 are attached to the heated wall 22 with a fastener 26 or fasteners 26. The heat fins 20 may be made of metal, such as steel or aluminum alloys or any other suitable good thermal conducting material. The heated wall 22 is also made of steel, aluminum alloy, or any other good thermal conducting material. A thermal paste is applied between the heat fins 20 and the heated 22 wall to facilitate good heat transfer from the heat fins 20 to the heated wall 22. The heat fins 20 extend into the second air flow chamber 18 and transfer the heat harvested from the air flow in the second air flow chamber 18 to the heated wall 22.

The side column 10 defines a chamber, space, or area 24 in a door guide outside the air flow chambers 16 and 18 to be heated. The chamber 24 is bordered, at least in part, by the heated wall 22, plastic and/or fiberglass side supports 28 and the plastic angles 30. Other embodiments may use any suitable poor thermal conducting materials for the side supports 28 and/or angles 30. No fins 20 extend into the space 24 to be heated. The side supports 28 contain insulation 29. As a result, neither the side supports 28 nor plastic angles 30 transfer heat to the heated chamber 24. Rather, the heated chamber 24 receives heat from the heated wall 22 (also referred to as the heat transfer wall 22) via the heated wall's 22 contact with the warmed air in the second flow chamber 18 and from the heat fins 20. In fact, all, or nearly all, of the heat that is transferred from the heated air in the second conduit or channel 18 to the space 24 is transferred through the heat transfer wall 22.

The heat transferred from the warm air flow in the second conduit 18 transfers into the fins 20 then through the thermal paste and into the heated wall 22. The heat is transferred from the heated wall 22 into the chamber 24. Normally, sufficient heat is transferred from the heated wall 22 to the chamber 24 to maintain the air temperature in the chamber 24 above freezing (and in some instances, well above freezing). As a result, frost and/or ice is less likely to develop or persist on portions of the door 33 residing in the heated chamber 24.

FIG. 3 is shown without the door 33 present to avoid crowding the drawings. The door 33 is normally present between the flexible air flow inhibiters 32. The flexible air flow inhibiters 32 help to reduce air flow between the warm and cold sides of the door 33. As described above, the chamber 24 is heated to reduce frost build up on a door 33. Frost build up can, over time, cause operational malfunctions and even damage to the door assembly and/or guiding assembly.

Figure 4:
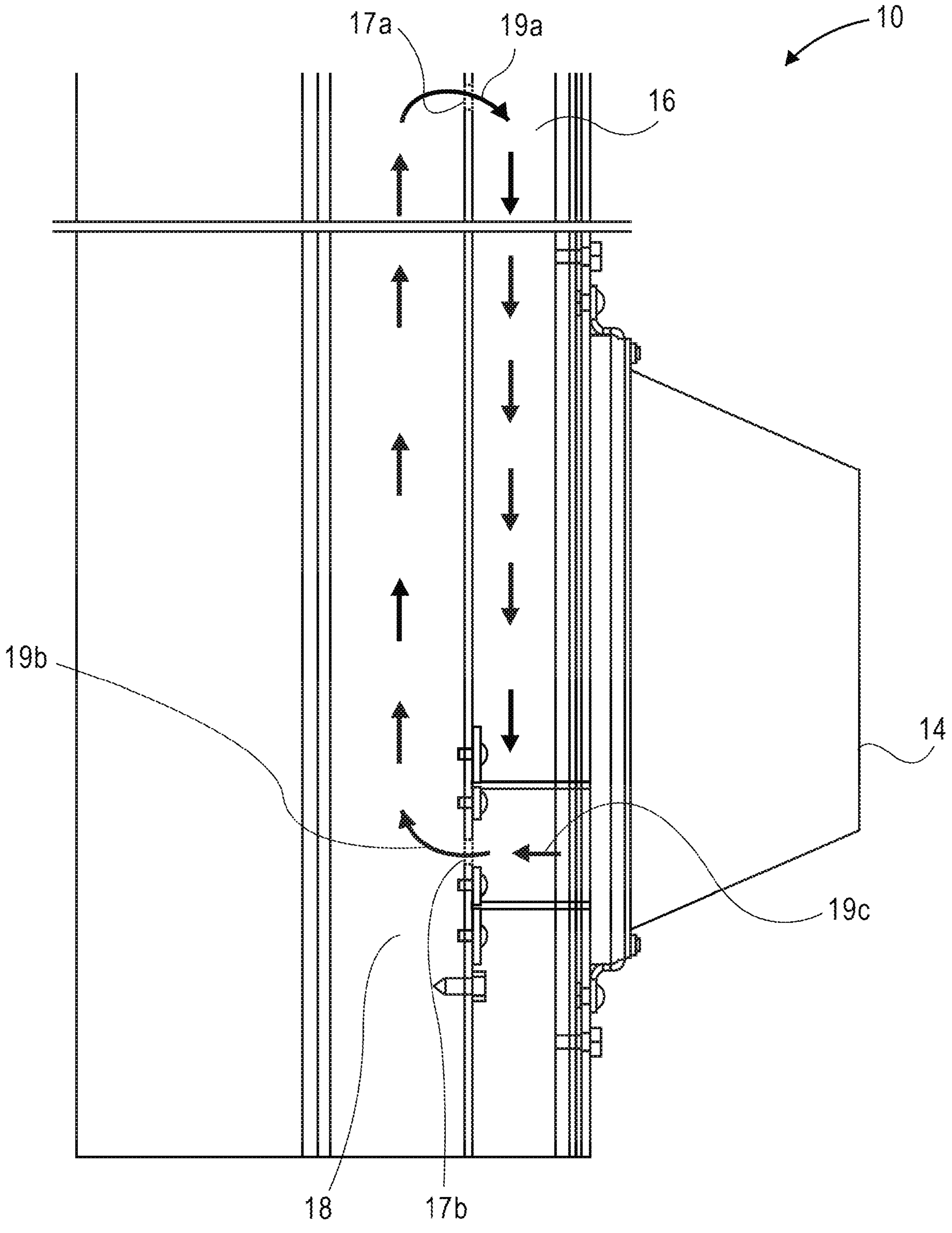
FIG. 4 is a partial side view of a support column in accordance with the present disclosure.

FIG. 4 shows a partial side view of the side column 10 with the heater 14. Air is warmed in the heater 14 and circulated out of the heater 14 and through the first 16 and second 18 air flow chambers as indicated by the arrows. The first 16 and second 18 air flow chambers are in fluid communication with each other to allow air to circulate from the heater 14 and through both air flow chambers 16, 18.

For example, there are openings 17*a* and 17*b* between the first 16 and second 18 air flow chambers at the top and bottom of the first and second air flow chambers 16 and 18, Air flows through the openings 17*a* and 17*b* as indicated at arrows 19*a* and 19*b*. Air exits the heater 14 as a result of an internal fan in the heater 14 and flows across the first air flow chamber 16 and into the second air flow chamber 18 as shown by arrow 19*c*. It will be understood that other air flow patterns may be used in other embodiments and still be accordance with the present disclosure.

In accordance with the present disclosure, the openings 17*a* and 17*b*, along with other features of the air flow chambers 16 and 18 direct air flow thereby allowing the air to circulate through the fins 20 (see FIG. 3). Air circulation through the fins 20 promotes good heat transfer from the air to the fins 20 along the length of the fins 20. For example, the air flow pattern described herein allows the warmed air in the second air flow channel 18 to flow through the fins 20 and distribute the heat along the length of the fins 20. In contrast, if the openings 17*a* and 17*b* where not present or not appropriately sized to promote good air flow and circulation through the first and second air flow channels 16 and 18, much of the heat in the heated air may be transmitting to a portion of the fins 20 located proximate to where the warmed air flows into the second chamber 18 but not well distributed on the length of the fins 20 in the second chamber 18.

If the air did not have a good pattern of circulation, heat transfer from the air to the fins 20 would be not as effective and would result in less heat being transferred from the fins 20 to the space 24 to be heated. In turn, this would result in less heat in the chamber or space 24 to be heated and possibly frost or ice build-up on the door 33 or columns 10.

The heater 14 may be typical resistance heater that draws in ambient air and/or air from the support column 10 and heats the air and circulates it with an internal fan. Other types of heaters 14 may also be used.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

The invention claimed is:

1. A method for heating a door guide area comprising:

channeling a flow of heated air in a longitudinal first direction in a first conduit;

channeling the flow of heated air in a longitudinal second direction different than the first direction in a second conduit;

providing the heated air to the second and first conduits by routing the heated air directly from a heater laterally across the first conduit to the second conduit;

transferring heat from the flow of heated air in the second conduit to a heated space outside of the first and second conduits; and configuring a side portion of a roll-up door to be in the heated space when the roll-up door is in a closed position.

2. The method of claim 1, wherein the first direction and second direction are in opposite directions.

3. The method of claim 1, further comprising extending heat transfer fins into the flow of heated air.

4. The method of claim 3, further comprising attaching the heat transfer fins to a heat transfer wall.

5. The method of claim 1, wherein the space outside of the first and second conduits is defined at least partially with a heat transfer wall.

6. The method of claim 5, wherein substantially all of the heat that is transferred from the flow of heated air to the heated space outside the first and second conduits is transferred directly into the heated space from the heat transfer wall.

7. The method of claim 1, further comprising circulating the heated air by channeling the heated air in the first direction and channeling the heated air in the second direction.

8. The method of claim 3, further comprising distributing heat to the heat transfer fins from the flow of heated air along a length of the heat transfer fins.

9. The method of claim 1, further comprising channeling the air from the first conduit back to the heater after the air has moved through the first and second conduits.

* * * * *